United States Patent
Matusik (10) Patent No.: US 7,609,327 B2
(45) Date of Patent: Oct. 27, 2009

(54) POLARIZATION DIFFERENCE MATTING USING A SCREEN CONFIGURED TO REFLECT POLARIZED LIGHT

(75) Inventor: Wojciech Matusik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 779 days.

(21) Appl. No.: 11/407,158

(22) Filed: Apr. 19, 2006

(65) Prior Publication Data

US 2007/0247553 A1    Oct. 25, 2007

(51) Int. Cl.
   *H04N 9/74* (2006.01)
(52) U.S. Cl. ........................ 348/591; 348/586
(58) Field of Classification Search ............... 348/578, 348/584–586, 590–593; 345/629, 634, 640; *H04N 9/74, H04N 9/76*
   See application file for complete search history.

(56) References Cited

U.S. PATENT DOCUMENTS

| 7,367,723 B2 * | 5/2008 | Matusik et al. | 396/505 |
| 7,408,591 B2 * | 8/2008 | Matusik et al. | 348/590 |
| 2006/0221248 A1 * | 10/2006 | McGuire et al. | 348/590 |

OTHER PUBLICATIONS

Chuang, Y.-Y., Zongker, D. E., Hindorff, J., Curless, B., Salesin, D. h., and Szeliski, R. 2000. Environment matting extensions: towards higher accuracy and real-time capture. In Proceedings of the 27th annual conference on Computer graphics and interactive techniques, ACM Press/Addison-Wesley Publishing Co., 121-130.

Chuang, Y.-Y., Curless, B., Salesin, D. H., and Szeliski, R. 2001. A Bayesian approach to digital matting. In Proceedings of IEEE CVPR 2001, IEEE Computer Society, vol. 2, 264-271.

Chuang, Y.-Y., Agarwala, A., Curless, B., Salesin, D. H., and Szeliski, R. 2002. Video matting of complex scenes. ACM Transactions on Graphics 21, 3 (July), 243-248. Special Issue of the SIGGRAPH 2002 Proceedings.

(Continued)

*Primary Examiner*—Sherrie Hsia
(74) *Attorney, Agent, or Firm*—Dirk Brinkman; Gene V. Vinokur (57) ABSTRACT

A method for extracting an alpha matte from images of a scene illuminated by unpolarized light is presented. A first pair of images is acquired with a foreground object placed in front of a background producing polarized light. One image of the first pair of images measures vertically polarized light of the scene, and a second image of the first pair of images measures horizontally polarized light of the scene. A second pair of images is acquired of the background producing the polarized light. One image of the second pair of images measures vertically polarized light of the background, and a second image of the second pair of images measures the horizontally polarized light of the background. The first and second pairs of images arte combined to generate an alpha matte and an alpha multiplied foreground.

11 Claims, 6 Drawing Sheets

OTHER PUBLICATIONS

Debevec, P., Wenger, A., Tchou, C., Gardner, A., Waese, J., and Hawkins, T. 2002. A lighting reproduction approach to live action compositing. ACM Transactions on Graphics 21, 3 (July), 547-556.

Porter, T., and Duff, T. 1984. Compositing digital images. In Proceedings of the 11th annual conference on Computer graphics and interactive techniques, ACM Press, 253-259.

Smith, A. R., and Blinn, J. F. 1996. Blue screen matting. In Proceedings of the 23rd annual conference on Computer graphics and interactive techniques, ACM Press, 259-268.

Ben-Ezra, "Segmentation with invisible keying signal," IEEE Computer Society Conference on Computer Vision and Pattern Recognition, vol. 1, pp. 1032-1038, 2000.

Zitnick, C. L., Kang, S. B., Uyttendaele, M., Winder, S., and Szeliski, R. 2004. High-quality video view interpolation using a layered representation. ACM Trans. Graph. 23, 3, 600-608.

Zongker, D. E., Werner, D. M., Curless, B., and Salesin, D. H. 1999. Environment matting and compositing. In Proceedings of the 26th annual conference on Computer graphics and interactive techniques, ACM Press/Addison-Wesley Publishing Co., 205-214.

* cited by examiner

$$\alpha = \min(\max(1 - \frac{\|I_1 - I_2\|}{\|B_1 - B_2\|}, 0), 1)$$

Fig. 6A $$\alpha F = 0.5 \times (I_1 + I_2 + (\alpha - 1)(B_1 + B_2))$$

Fig. 6B

POLARIZATION DIFFERENCE MATTING USING A SCREEN CONFIGURED TO REFLECT POLARIZED LIGHT

FIELD OF THE INVENTION

This invention relates generally to computer graphics and computer vision, and more particularly to extracting alpha mattes and alpha multiplied foregrounds.

BACKGROUND OF THE INVENTION

Matting and compositing is a well-known problem in both computer graphics and computer vision. Matting separates background and foreground regions in an image or video. Practical methods that yield high quality mattes are extremely important for special effects, television and movie industry. Unfortunately, most prior art methods for extracting high-quality alpha mattes from a video either require user assistance or uniformly colored background screens, e.g., blue or green backgrounds. Mattes are used to composite foregrounds and backgrounds, e.g., a weatherman in front of a weather map.

There are two problems with colored screen matting. First, the foreground cannot include any of the background colors, e.g., the weatherman cannot wear any clothing that is the same color as the background. Second, the background color can 'spill' onto the foreground, which considerably changes the appearance of the scene. Even when the background is known exactly, extracting the alpha matte is an under-constrained problem.

Matting has been described extensively since the 1950s, see Vlahos, "Composite photography utilizing sodium vapor illumination," May, 1958, and U.S. Pat. No. 3,095,304. Blue screen matting was formalized mathematically by Smith and Blinn, "Blue screen matting," Proceedings of the 23rd Annual Conference on Computer Graphics and Interactive Techniques, ACM Press, pp. 259-268, 1996.

Blue screen matting relies on the use of a uniformly colored background and constraining the foreground colors to not be similar to the background color. As shown by Blinn and Smith, imaging a static scene under a known background allows for deriving a correct solution for both the alpha matte and the foreground color without constraints placed on the foreground colors.

Blue screen matting methods have been extended to cover more complicated light transport effects, e.g., refraction, using multiple background patterns, Zongker et al., "Environment matting and compositing," Proceedings of the 26th Annual Conference on Computer Graphics and Interactive Techniques, ACM Press/Addison-Wesley Publishing Co., pp. 205-214, 1999; and Chuang et al., "Environment matting extensions: towards higher accuracy and real-time capture," Proceedings of the 27th Annual Conference on Computer Graphics and Interactive Techniques, ACM Press/Addison-Wesley Publishing Co., pp. 121-130, 2000.

Bayesian matting can be used for static scenes, Chuang et al., "A Bayesian approach to digital matting," Proceedings of IEEE CVPR 2001, vol. 2, pp. 264-271, 2001. That method assumes a user-specified trimap and a low frequency background. Bayesian techniques can also adapt blue screen matting to complex scenes, Chuang et al., "Video matting of complex scenes," ACM Transactions on Graphics, vol. 21, no. 3, pp. 243-248, July 2002. In that method, a user specifies tri-maps for key frames in the video.

Another method uses a camera array and a stereo process to automatically determine the trimaps, Zitnick et al., "High-quality video view interpolation using a layered representation," ACM Transactions on Graphics, vol. 23, no. 3, pp. 600-608, 2004.

Another technique, difference matting, also known as background subtraction, solves for the alpha matte and an alpha multiplied foreground given background and trimap images, Qian and Sezan, "Video background replacement without a blue screen," Proceedings of ICIP, vol. 4, pp. 143-146, 1999.

Difference mattes have limited discrimination at borders between the background and foreground. Another alternative is to use back lighting to extract the matte. Back lighting is a common segmentation method used in many commercial computer vision systems. Back lighting has also been used in image-based rendering systems, Debevec et al., "A lighting reproduction approach to live action compositing," ACM Transactions on Graphics, vol. 21, no. 3, pp. 547-556, July 2002. That method requires active illumination, which may not always be possible, and can produce incorrect results near object boundaries because some objects are highly reflective at grazing angles of incident light.

Another method is invisible key segmentation, which illuminates the scene with polarized light, or alternatively employs a polarized back-light, and segments the image based on polarization with a chroma-key-like algorithm, Ben-Ezra, "Segmentation with invisible keying signal," IEEE Computer Society Conference on Computer Vision and Pattern Recognition, vol. 1, pp. 1032-1038, 2000. That method cannot operate under natural illumination, and requires specialized lighting assemblies to produce polarized light.

Therefore, it is desired to provide a matting method that allows arbitrary colors in the foreground of a scene illuminated by ambient, mostly unpolarized light, and that does not introduce the color spill of the uniform background color.

SUMMARY OF THE INVENTION

One embodiment of the invention provides a system and method for extracting an alpha matte from images of a scene illuminated by ambient light. In a scene, a foreground object is placed in front of a known background that produces polarized light by reflection from a special screen. The light reflected from the foreground object is mostly unpolarized.

A camera acquires pairs of images of the scene. The camera can have multiple lenses and sensors such that centers of projection are substantially coincident. The sensors measure different polarizations of light in the scene, e.g., horizontal and vertical polarization. In another embodiment, the camera has a single lens and single sensor that measure time-multiplexed, differently polarized light in the scene in pairs of images.

A solution of the matting problem is constrained by using two synchronized image sequences that were acquired with the camera having single center of projection. Each of the video sequences measures differently polarized light. Because the foreground reflects or emits mostly unpolarized light, and the background reflects polarized light, we can observe the foreground object under two different backgrounds, i.e., black and white, and therefore constrain the matting problem.

By combining the first image of the pair having a white background because the first image measures vertical polarized light with the corresponding second image of the pair having a black background because the second image measures horizontal polarized light, the alpha matte $\alpha$ can be extracted, as well as the alpha multiplied foreground $\alpha F$.

DETAILED DESCRIPTION OF THE PREFERRED EMBODIMENT

Polarization Difference Matting Cameras

Figure 1:
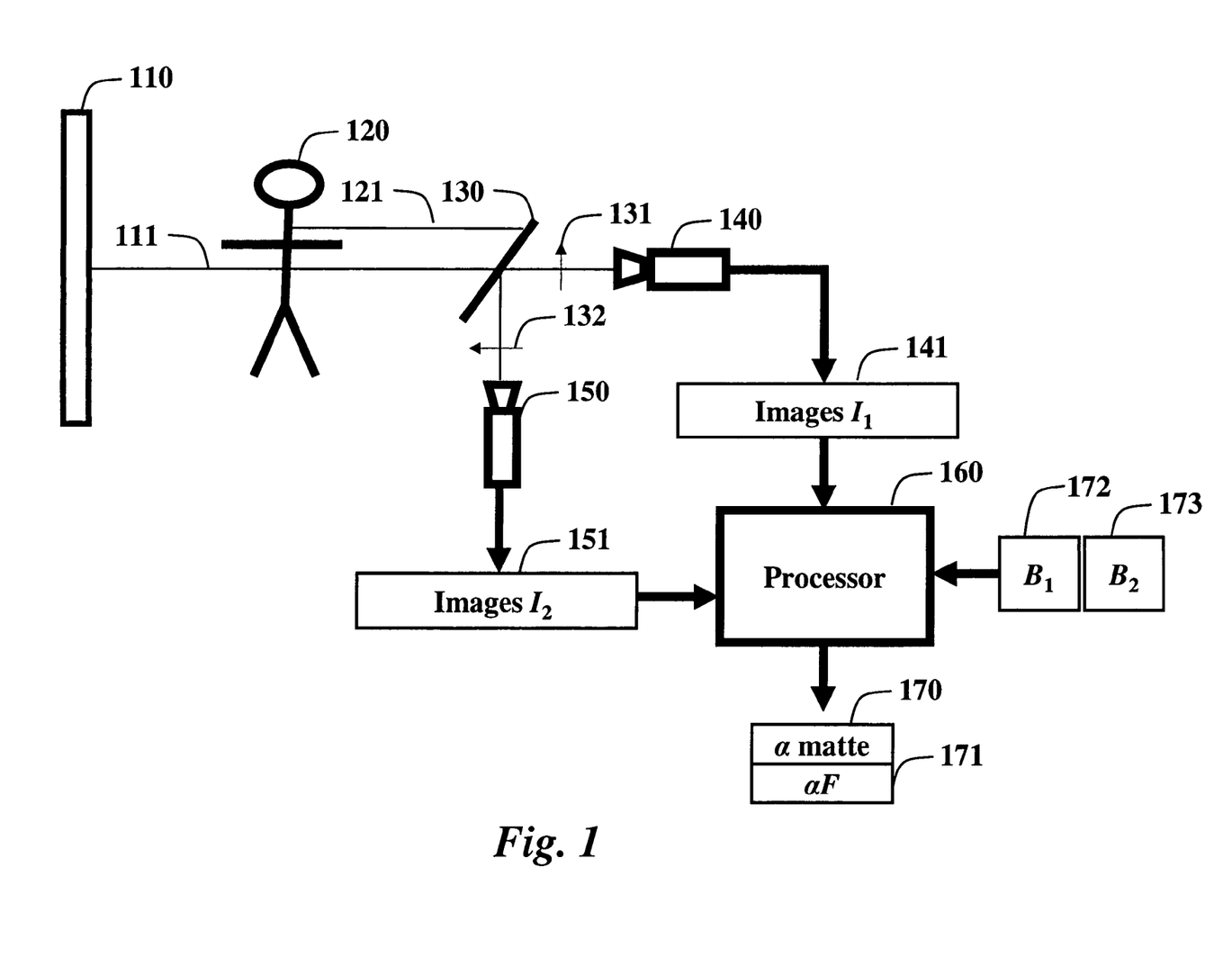
FIGS. 1-4 are block diagrams of camera systems for extracting alpha mattes using unpolarized light according to embodiments of the invention.

FIG. 1 shows a first embodiment of the invention. A background 110 produces polarized light 111 having a known polarization. The polarized light is produced by reflection. A foreground object 120 is placed in front of the background. The foreground object is illuminated by some light and produces mostly unpolarized light 121. The background and foreground light passes through a beam splitter 130. The bean splitter separates the light into vertical and horizontal polarized components 131-132.

A first camera 140 acquires one or more images $I_1$ 141 of the scene with the foreground measuring polarized light, e.g., light polarized vertically. A second camera 150 acquires one or more images $I_2$ 151 of the scene with the foreground measuring differently polarized light, e.g., light polarized vertically. That is, the images $I_1$ and $I_2$ form first pairs of images.

Second pairs of images, $B_1$ and $B_2$, 172-173, of the scene without the foreground, i.e. with only the known background 110, can be also acquired. These pairs of images measure vertically and horizontally polarized light, respectively. The pair of background images 172-173 need only be acquired one time because the background is static, and can be performed in a preprocessing step and stored for later use during real-time operation.

It should be understood that the system and method according to the embodiments of invention can be used with pairs of images, or sequences of pairs of images, e.g., two substantially synchronous videos. Note also that the centers of projection are substantially coincident for the various light paths.

Figure 2:
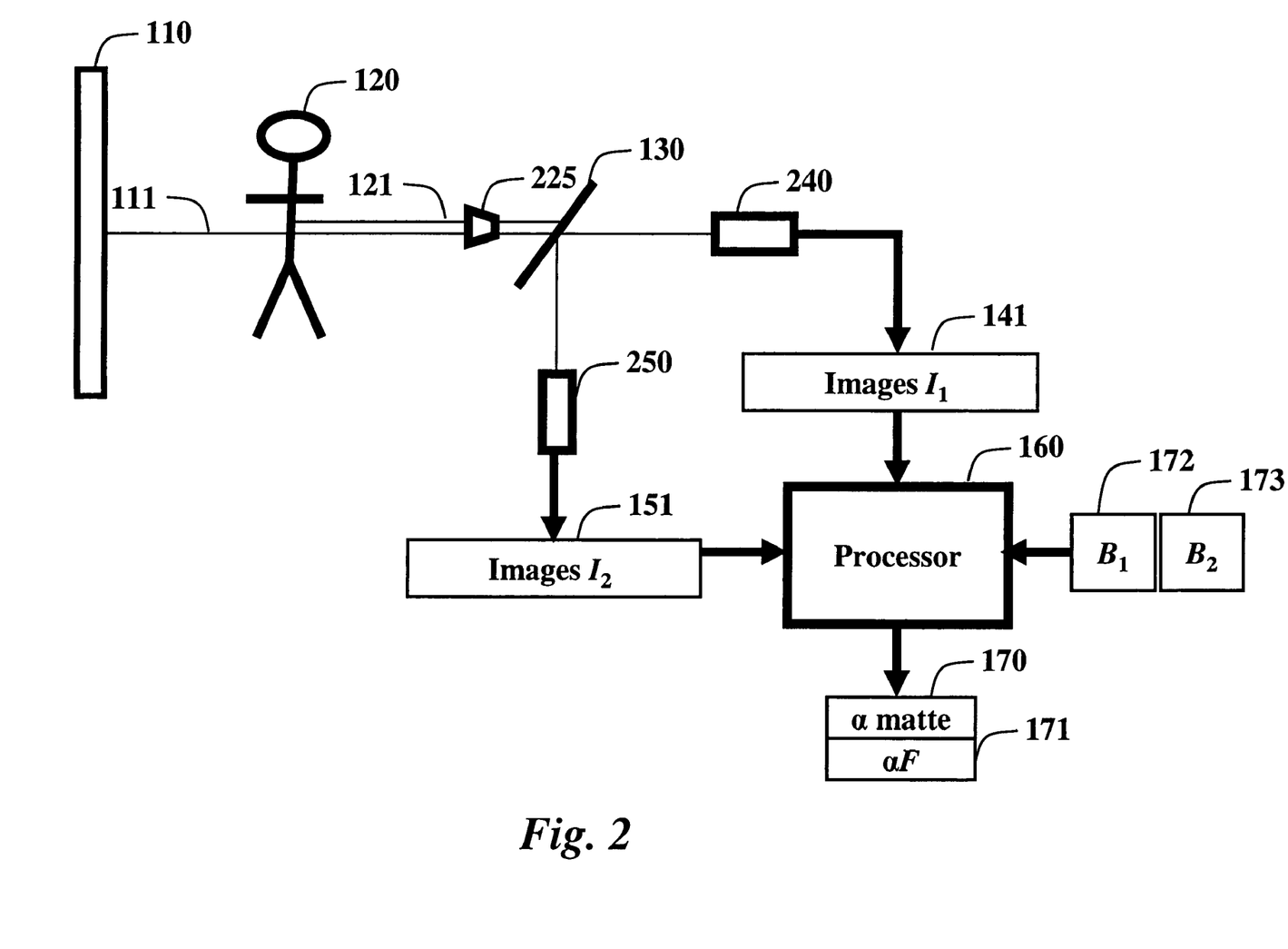
Figure 6A:
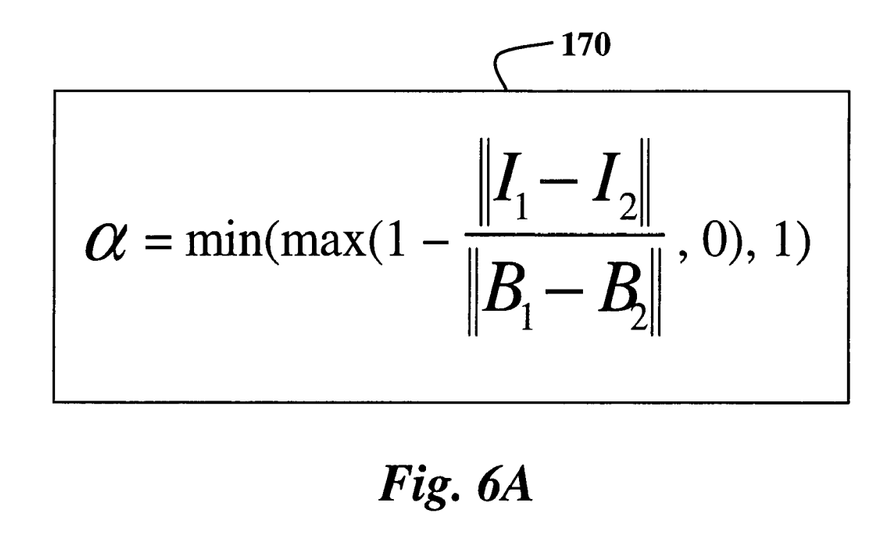
FIGS. 6A and 6B are block diagrams of the combining of a pair of images to obtain an alpha matte and alpha multiplied foreground according to an embodiment of the invention.
Figure 6B:
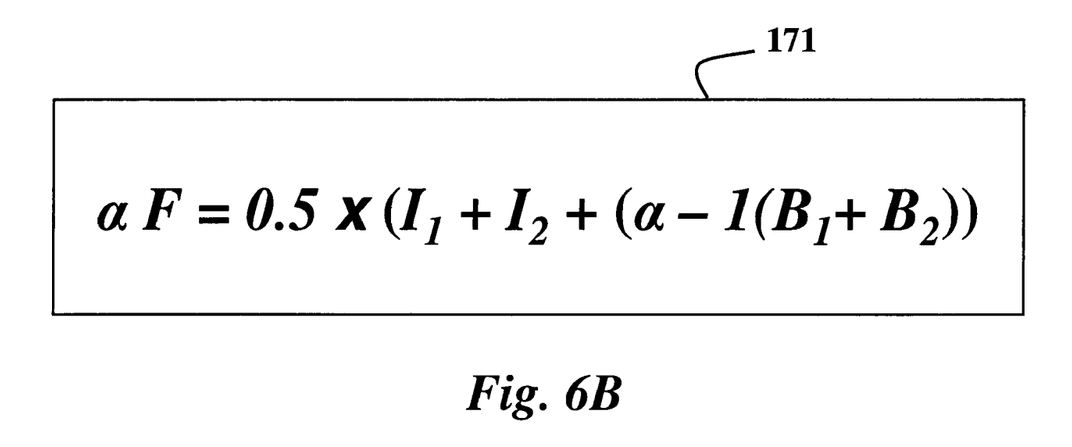

The two pairs of images, $I_1$ and $I_2$ and $B_1$ and $B_2$, are combined by the processor 160 to produce a matte α 170 and an alpha multiplied foreground αF 171 for each pair of images, see FIGS. 6A-6B. For static scenes, the pairs of images, $I_1$ and $I_2$ and $B_1$ and $B_2$, can be acquired at any time. However, if the scene is changing dynamically due to motion and/or changes in illumination, then better results are obtained when the acquisition of the first pairs of images, $I_1$ and $I_2$, is substantially synchronized. As shown in FIG. 2, another embodiment uses a single lens 225 and two sensors 240 and 250.

Figure 3:
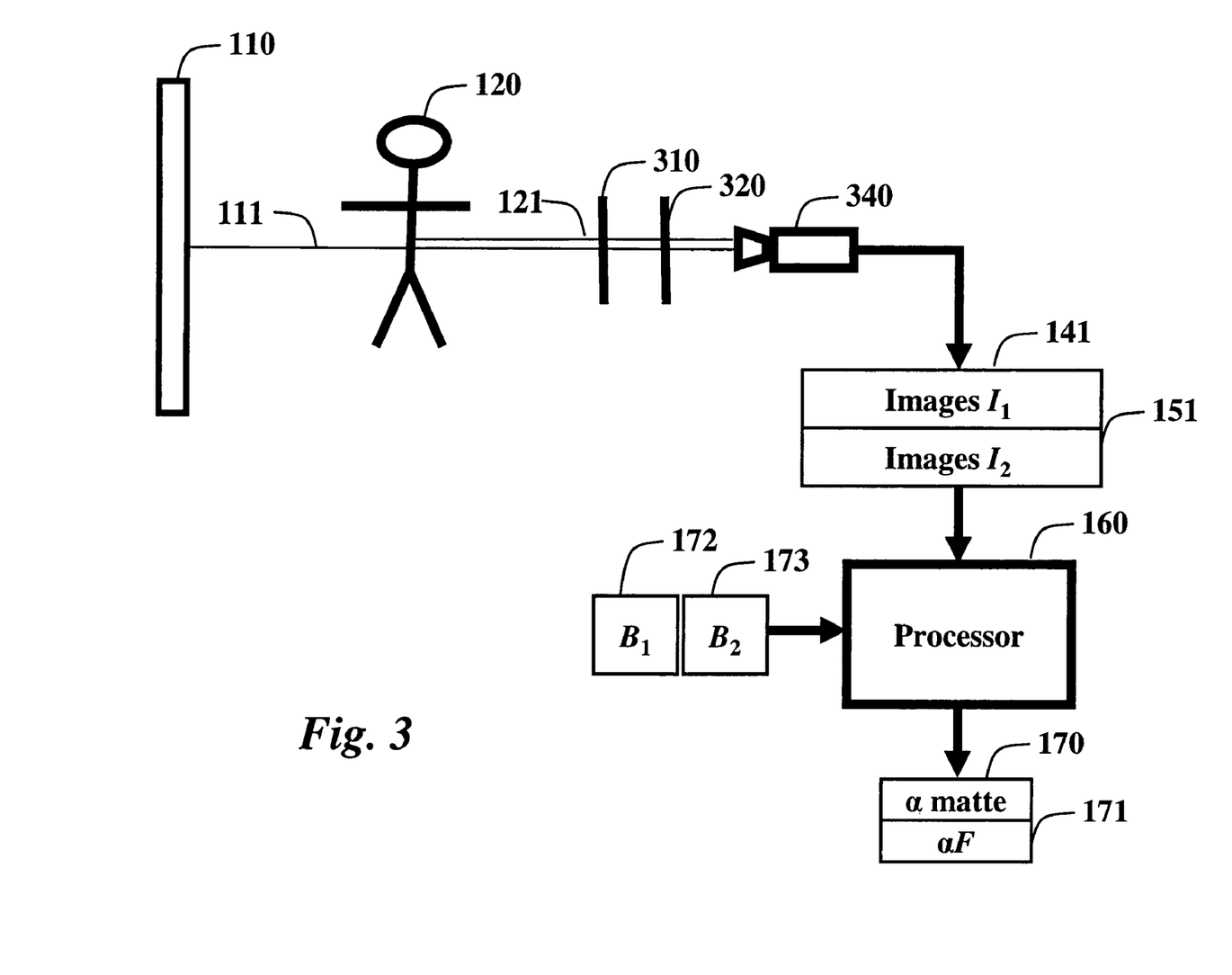

As shown in FIG. 3, another embodiment uses a polarization rotator 310, for example, a ferroelectric liquid crystal, and a polarizer 320, and a single camera that alternately acquires the images $I_1$ and $I_2$ in a time-multiplexed manner as the rotator 310 rotates through 90 degree offsets so that the rotator and polarizer are alternately aligned and offset. This arrangement will produce adequate results as long as a rate of change in the scene is less than a frame rate of the camera.

Figure 4:
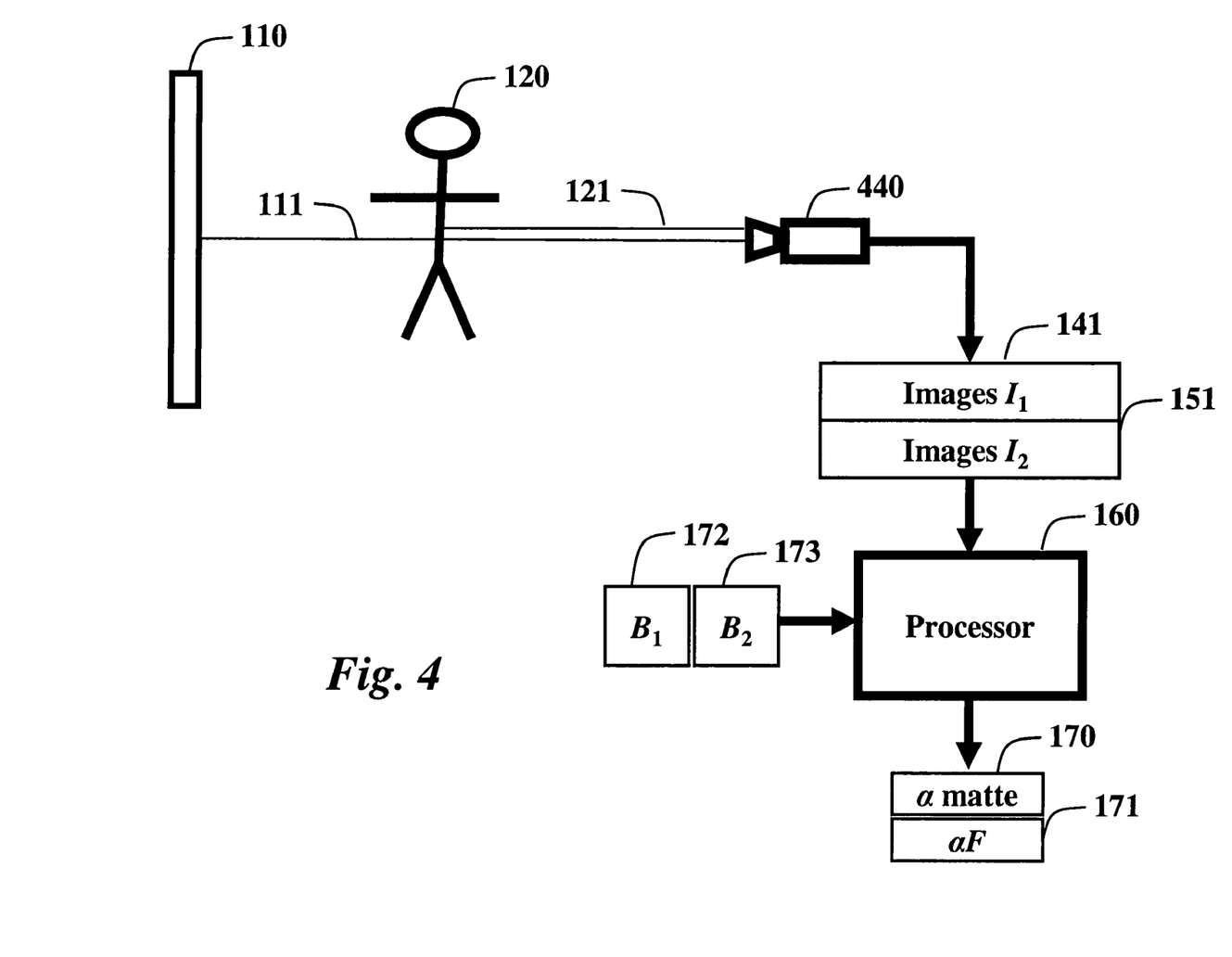

FIG. 4 shows a single camera 440 with a modified sensor, in which different sensor pixel elements, e.g. photosites, of the camera have polarization filters placed in front of the elements at different direction. One arrangement uses a 'checkerboard' pattern for the polarization filters. In this design the 'white' square is covered with a polarization filter in the vertical direction, and the 'black' square with a filter in the horizontal direction. This arrangement minimizes the effect of spill of the polarized light from the background on the foreground. The polarization of the filters in the checkerboard pattern can alternate over time.

Background and Foreground Design

A simple background that produces polarized light can be constructed as follows. For example, the background is white paper covered with a linearly polarized filter, e.g., a polyvinyl alcohol-iodine filter. In this case, when the polarization of the images and the background match, e.g. vertically polarized images $I_1$, the foreground can be observed against a white background color of background image $B_1$. However, when the polarization is rotated by 90 degrees, the foreground is observed against a black background color, of $B_2$, i.e., horizontally polarized images $I_2$.

Figure 5A:
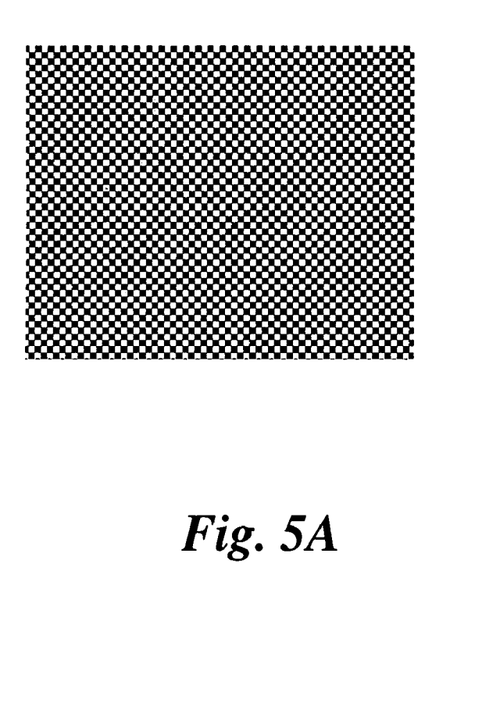
FIGS. 5A-5C are block diagrams of spatially arranged polarization filters on a background according to embodiments of the invention.
Figure 5B:
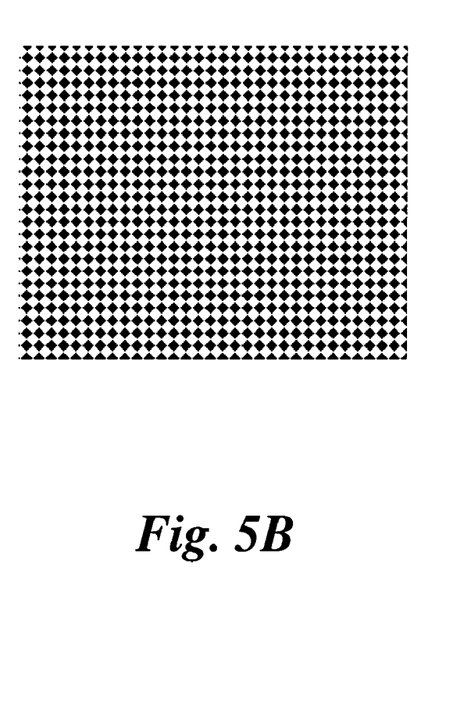
Figure 5C:
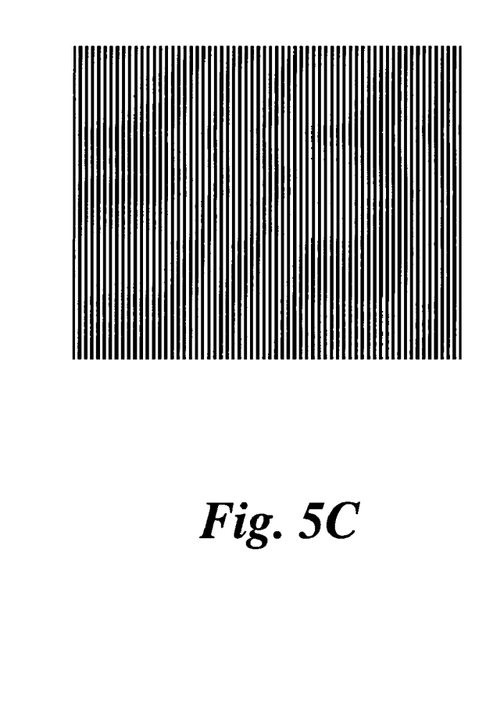

To reduce the light spill of the background on the foreground, the light produced by the foreground is ambient light which is substantially unpolarized. However, if some of the strongly polarized background reflects on the foreground, then the light reflected from the foreground might become polarized. To alleviate this problem, a polarized background in which the polarization direction varies spatially can be constructed. For example, the polarization filters are placed in a checkerboard patterns or stripes as shown in FIGS. 5A, 5B, and 5C. It should be understood, that by stating that the polarizations are vertical and horizontal, it is merely meant that the polarizations are offset by 90 degrees relative to each other. That is, the polarizations are orthogonal.

Background and Foreground Images

Let an image of a foreground object against a black background be αF and an image of the background without the foreground be B. Let α be an image where each pixel represents a partial coverage of that pixel by the foreground object. The alpha image is essentially an image of the foreground object painted white, evenly lit, and held against a black background.

A scale and resolution of the foreground and background images in world-space differs. Due to perspective foreshortening, the pixels of αF and α correspond to a smaller world-space area than those formally defined for an alpha matte, pre-multiplied alpha, and their algebraic composition, Porter and Duff, "Compositing digital images," Proceedings of the 11th Annual Conference on Computer Graphics and Interactive Techniques, ACM Press, 253-259, 1984, incorporated herein by reference. They show that for a pinhole camera, the image of αF in front of, or 'over' in their notation, B is given by linear interpolation:

$$I_p = \alpha F + (1-\alpha)B. \qquad (1)$$

Their definition of α and compositing holds only for sub-pixel coverage. That is, when the foreground object is opaque and partially occludes each pixel due to motion blur, or because a silhouette of the foreground object lies within the pixel, i.e., conventional sub-pixel coverage. Their definition can be extended to model defocus, i.e., sub-aperture coverage of a 'pencil' of rays from the pixel, by blurring the images and changing the interpolation parameter at each pixel.

Although α is frequently used in real-time rendering and computer graphics as an approximation to colored transparency, i.e. filtering, that use is a different phenomenon than what is described here, and is not accurately modeled by the linear interpolation of Equation 1. Therefore, these two different uses of α are strictly distinguished here.

Matting is under constrained as posed. Recall that the goal is to recover $\alpha$, $\alpha F$ and B, although the background B is frequently discarded, given the composite $I_P$. Under the pinhole composition model in Equation 1, there are seven unknowns ($F_r$, $F_g$, $F_b$, $\alpha$, $B_r$, $B_g$, $B_b$) for colors (rgb), and only three constraints ($I_{Pr}$, $I_{Pg}$, $I_{Pb}$), so there is not a unique scene for each composite image. The polarization matting method according to the invention therefore constrains the problem.

Matting Method

The matting method according to embodiments of the invention constrains the matting problem by using the pairs of images $I_1$ 141 and $I_2$ 151 that measure different light polarizations, and the background 110 that produces polarized light.

For example, the first images $I_1$ and $B_1$ in each of the two pairs measure vertically polarized light, and the second images $I_2$ and $B_2$ in each pair measure horizontally polarized light, such that $$I_1 = \alpha F + (1-\alpha)B_1, \text{ and} \quad (2)$$

$$I_2 = \alpha F + (1-\alpha)B_2. \quad (3)$$

The pre-recorded, background images $B_1$ and $B_2$ are known, The method determines $\alpha$ and F directly by combining the images ($I_1$ and $I_2$) and ($B_1$ and $B_2$) and solving for the unknown $\alpha$ and F. Combining Equations 2 and 3, as shown in FIGS. 6A and 6B, yields an expression for the alpha matte 170:

$$\alpha = \min\left(\max\left(1 - \frac{\|I_1 - I_2\|}{\|B_1 - B_2\|}, 0\right), 1\right), \quad (4)$$

and an expression for the alpha multiplied foreground image 171:

$$\alpha F = 0.5 \times (I_1 + I_2 + (\alpha - 1)(B_1 + B_2)). \quad (5)$$

Alternatively, $\|B_1 - B_2\|$ can be assumed to be a user-specified constant. Similarly, $(B_1 - B_2)$ can be also user-specified. Therefore, they would not need to be explicitly measured.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for extracting an alpha matte from images of a scene illuminated by unpolarized light, comprising the steps of:

acquiring a first pair of images of a scene with a foreground object placed in front of a background producing polarized light, a first image of the first pair of images measuring vertically polarized light of the scene, and a second image of the first pair of images measuring horizontally polarized light of the scene; and acquiring a second pair of images of the background producing the polarized light, a first image of the second pair of images measuring vertically polarized light, and a second image of the second pair of images measuring horizontally polarized light; and combining the first and second pairs of images to generate an alpha matte and an alpha multiplied foreground.

2. The method of claim 1, in which the first image in each pair is acquired by a first camera placed behind a beam splitter, and the second image in each pair is acquired by a second camera placed behind the beam splitter at a right angle to the first camera.

3. The method of claim 1, in which a sequence of first pair of images is acquired, and the alpha matte and the alpha multiplied foreground are generated by combining each first pair in the sequence with the second pair of images.

4. The method of claim 1, further comprising:
synchronizing the images in the first pair.

5. The method of claim 1, further comprising:
synchronizing the images in the first and second pairs.

6. The method of claim 1, in which light paths for acquiring all images have centers of projection that are substantially coincident.

7. The method of claim 1, in which the first image in each pair is acquired by a first sensor placed behind a beam splitter, and the second image in each pair is acquired by a second sensor placed behind the beam splitter at a right angle to the first sensor, and a lens is arranged before the beam splitter.

8. The method of claim 1, in which the first image in each pair is acquired by a camera placed behind a polarization rotator and a polarizer when the polarizing rotator and polarizer are aligned, and the second image in each pair is acquired by the camera when the polarizing rotator and polarizer are offset by 90 degrees.

9. The method of claim 1, in which the two pairs of images are acquired by a camera having sensor pixel elements having polarization filters placed at different direction in front of the sensor pixel elements.

10. The method of claim 9, in which different directions of the sensor pixel elements are arranged in a checkerboard pattern.

11. The method of claim 1, in which the first pair of images is $I_1$ and $I_2$, and the second pair of images is $B_1$ and $B_2$, and the combining is $$\alpha = \min\left(\max\left(1 - \frac{\|I_1 - I_2\|}{\|B_1 - B_2\|}, 0\right), 1\right)$$

for the alpha matte, and $$\alpha F = 0.5 \times (I_1 + I_2 + (\alpha - 1)(B_1 + B_2))$$

for the multiplied foreground image.

* * * * *